United States Patent [19]

Boccia

[11] 4,024,010
[45] May 17, 1977

[54] OPEN PROFILE BAG

[75] Inventor: Salvatore Boccia, Blauvelt, N.Y.

[73] Assignee: Minigrip, Inc., Orangeburg, N.Y.

[22] Filed: May 15, 1975

[21] Appl. No.: 577,883

[52] U.S. Cl. .............................. 156/290; 93/33 H; 156/251

[51] Int. Cl.² ...................................... A41H 37/00

[58] Field of Search ............ 24/201 C; 156/66, 92, 156/152, 164, 251, 252, 253, 269, 290, 293, 303, 306, 324, 423, 494, 495, 515, 516, 530, 544, 583; 428/83, 99, 101, 133, 177, 192, 194; 150/3; 93/33 R, 33 H, 8 R, 8 WA, 35 R

[56] References Cited
UNITED STATES PATENTS 3,202,559   8/1965   Laguerre ........................... 156/251
3,340,116   9/1967   Naito ................................. 156/92

Primary Examiner—David A. Simmons

Attorney, Agent, or Firm—Hill, Gross, Simpson, Van Santen, Steadman, Chiara & Simpson

[57] ABSTRACT

A method and mechanism for preparing individual reclosable thin plastic bags with rib and groove profiles delivered in unengaged position on the finished bag, whereby said bags are made from a continuous supply of layers of film having critically shaped small rib and groove profiles on facing surfaces thereof interlocked with each other and continuously advancing the layers of film and inserting a fixed separating finger between the rib and groove profiles so as to draw them apart, maintaining the profiles in alignment by grooves which do not press the profiles flat but carefully guide them laterally, guiding the film profile layers toward each other and then immediately pressing the profile layers together with a sealing and cutting means following the finger, so that the profiles are interlocked at the location of sealing only.

6 Claims, 6 Drawing Figures

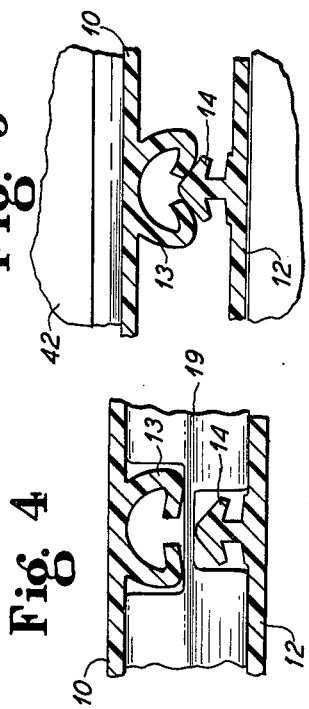
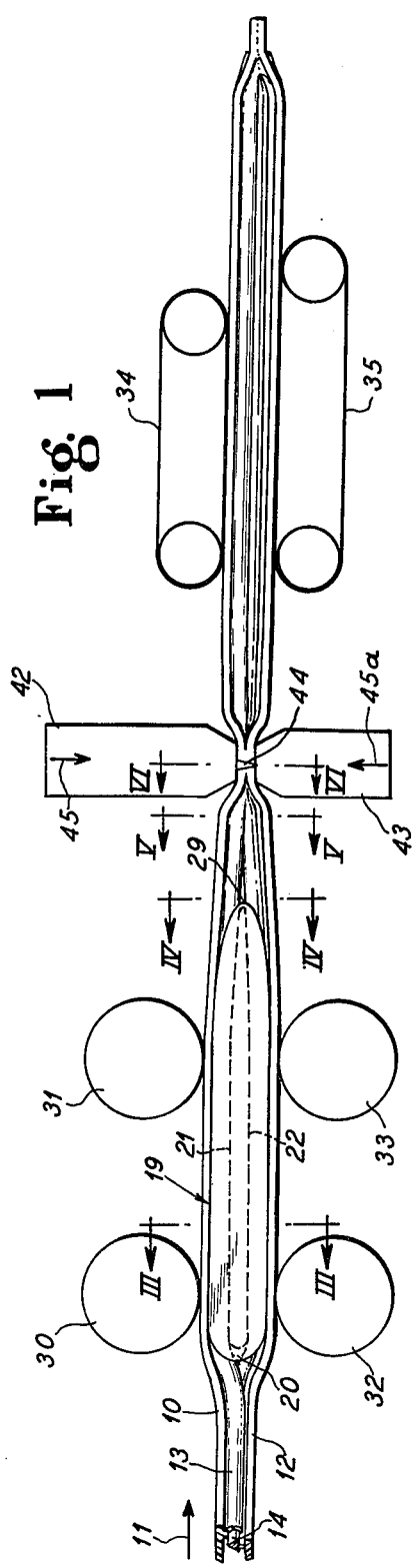
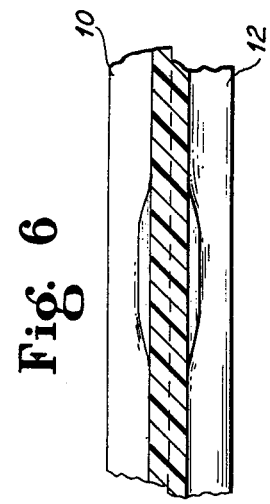
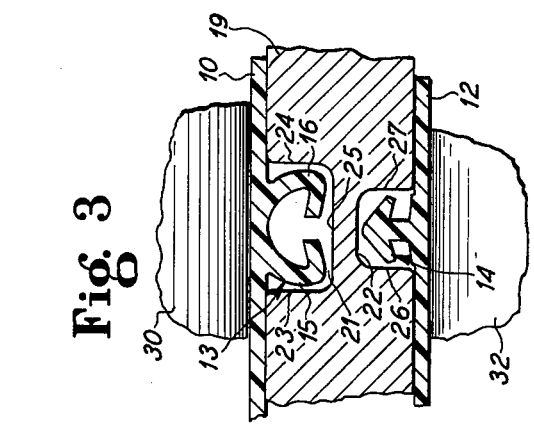
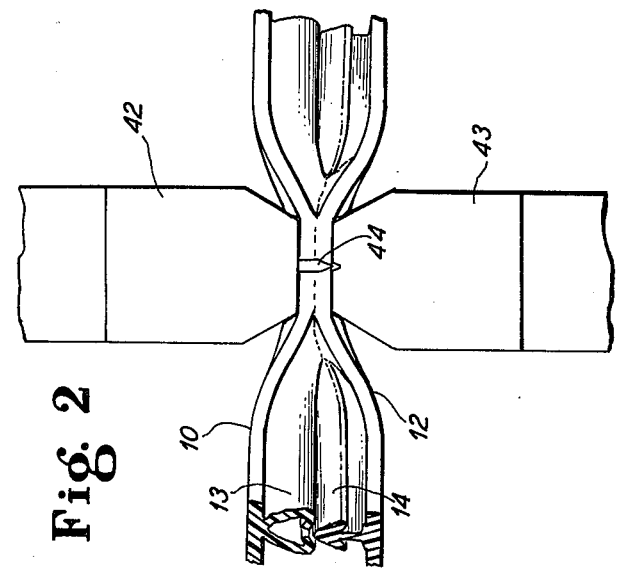

OPEN PROFILE BAG

BACKGROUND OF THE INVENTION

The invention relates to improvements in methods and mechanism for forming bags with interlocking continuous fasteners or zippers thereon wherein the bags are formed of a thin plastic film, and delivered with the profiles in separated condition. The continuous material is normally formed by an extrusion process with the profiles automatically interlocked during the completion of the process, as exemplified in the teachings of U.S. Pat. No. 3,340,116, Naito.

In making bags from material of this type, the film, which is very thin on the order of several mils is formed with the fasteners normally being integral thereon. The profiles are interlocked so that they will maintain their shape during the time the film is stored on a roll and handled and shipped. Individual bags are made from the continuous roll of film by cross-cutting ends off of the layers of film and sealing the edges. The individual bags are then used by pulling the interlocked rib and groove fasteners apart by flanges provided above the profiles so that the bags can be filled and resealed.

It has been generally customary to produce such bags with a closed top and the profiles engaged, and the user must, therefore, separate the top edges of the bag by separating the rib and groove elements when the bag is to be filled. The bags have come off of the bag machine with interlocked profiles, and separation must be made before the bags can be used and filled. This is an extra operation which consumes effort and time. Where the bags are to be hand loaded, it normally requires about 50% more time than if the bag were available with an open top with the profiles separated. Where automatic loading is used, a method has to be provided to open the profile in order that the bag can be delivered to the filling station with the top open. Efforts have been made to separate the rib and groove elements at different positions before cross-sealing and cutting the bags, but these have been proven unsuccessful in that when the rib and grooves are separated and cross-sealing takes place, the rib and groove often do not rejoin. Either they stay apart of miss each other so that the rib is beside the groove. If this occurs, the bag cannot thereafter be effectively sealed because when the rib and groove are attempted to be pressed together, the rib does not start into the groove, but presses beside it so that the fastener never can interlock. This has particularly become the case with improved methods of manufacture and improved plastics which make it possible to make the rib and grooves very small and yet sufficiently strong to provide a good closing interlock. The smaller the rib and groove units, the more difficult it is to join them when the seal is formed at the edge of the bag, and as above stated, they must be joined at the edge or they will not interlock when a pressure is applied to attempt to interlock them and close the bag.

It is accordingly an important object of the invention to provide a method and structure for completing reclosable bags which have continuous interlocking elements along the top, and wherein the bag is opened, and the interlocking elements are separated after the bag is delivered to the customer. The same problem occurs and is solved by the invention where the customer makes the bags on his premises and desires to have an open bag to fill which does not have to be opened by a separate operation.

A feature of the invention is to take the continuous supply of bag material having opposing thin plastic film layers with interlocked facing rib and groove profiles along one edge and to insert a separating finger between the rib and groove profiles to separate them. They are separated, but the rib and groove profiles are maintained in opposing alignment with each other by traveling along in grooves in the separating finger with the grooves being sufficiently deep so that they guide the sides of the rib and groove, but do not engage the surfaces facing each other to in anyway flatten the rib and groove. A further feature of the invention then resides in immediately interlocking and cross-sealing the profile very close to the separating finger end while the profiles are maintained in exact alignment, and the profiles are brought into almost closed position just before joining and sealing so that the rib and groove elements move a minimum distance to engage and interlock when struck by the sealer.

Other objects, advantages and features, as well as equivalent methods and structures which are intended to be covered herein, will become more apparent with the teaching of the principles of the invention in connection with the disclosure of the preferred embodiments in the specification, claims and drawings, in which:

DRAWINGS

FIG. 1 is an end elevational view somewhat schematically shown, of layers of film being handled in accordance with the method of the present invention, and mechanism embodying the principles of the invention;

FIG. 2 is a fragmentary view of a portion of FIG. 1 illustrating sealing being performed;

FIG. 3 is an enlarged fragmentary sectional view taken substantially along line III—III of FIG. 1;

FIG. 4 is an enlarged fragmentary sectional view taken substantially along line IV—IV of FIG. 1;

FIG. 5 is an enlarged fragmentary sectional view taken substantially along line V—V of FIG. 1; and FIG. 6 is an enlarged fragmentary sectional view taken substantially along line VI—VI of FIG. 1.

DESCRIPTION

As illustrated in FIG. 1, opposed layers of thin film 12 and 10 are brought forward from a supply in the direction of the arrowed line 11. The thin film layers have on their facing surfaces critically shaped small interlocking rib and groove profiles illustrated by a rib 14 and a groove 13. As is customary from the production machine, the material is rolled onto rolls, with the profiles interlocked, and when it is to be made into bags, it is unrolled off of the rolls.

To open the profiles, the film layers and the interlocked profiles are fed over a separating finger 19. The separating finger has a smooth rounded leading edge 20 which forces the rib and groove profiles to separate, and the profiles travel into grooves 21 and 22 on the upper and lower surfaces of the finger 19. The separating finger is positioned along the path of travel of the film layers so that the rib and groove elements 14 and 13 enter into the grooves in the finger. As illustrated in FIG. 3, the grooves 21 and 22 in the surfaces of the finger 19 have a size so that the outer surfaces of the finger beside the grooves push upwardly and downwardly on the film, and the groove and rib elements 13 and 14 lie in the grooves without touching the bottom. Also, the sides of the finger grooves are such that they guide the rib and groove profiles by engaging them laterally, but not on their facing surfaces, so that they in no way tend to flatten the rib or groove profile.

The finger groove 21 for the groove profile 13 has sides 23 and 24 which may just touch the groove profile 13, but the bottom 25 is sufficiently deep that the lower ends of the groove profile generally do not slide against the surface 25.

Similarly, the width of the groove 22 for the rib profile 14 is such that the tip of the rib generally does not hit the bottom 22, but the sides 26 and 27 are such that they laterally guide the rib in an upright position. The grooves 21 and 22 are positioned on the finger so that they maintain the rib and groove profiles exactly opposite each other.

Thus, as the rib and groove pass over the finger and are separated, they will again approach each other on the offrunning side of the finger. The finger is of a thickness so that the rib and groove are separated as smoothly as possible and thereafter the distance between the finger grooves is reduced to only a fraction of an inch, with the material of the finger between the base of the grooves 21 and 22 at the running off side being of sufficient thickness only to give the finger sufficient strength. To help insure that the rib and groove elements ride in the finger grooves, pressure or retaining rollers 30 and 32 are positioned opposite each other and similar retaining rollers 31 and 33 are positioned opposite each other to press the film lightly against the finger and to keep the profiles into their respective grooves as they slide therebetween. The finger will have smooth polished outer surfaces which may be Teflon coated for easy sliding of the film.

The finger will be tapered to a point at 29 so that the rib and groove elements 14 and 13 can approach each other while still being guided in the grooves of the finger. Their relative position is shown on the offrunning side of the finger in FIG. 4.

As illustrated in FIG. 5, at the time of reaching the sealer, the rib element 14 should be seated just against the groove element 13, and ready to enter between the jaws when sealing bars 42 and 43 press against the outer surfaces of the film to form a cross-seam.

The film material is drawn forward in a suitable way such as by belts 34 and 35. The belts are driven by suitable mechanism, not shown, which drives them intermittently in coordination with the drive for operating the sealing bar 42. This drive is also omitted, but may be of conventional design, such as a pneumatic cylinder, indicated schematically by the arrowed line 45. Preferably, the belts maintain a slight tension on the material when not drawing it forward. If desired, the lower sealing bar may be stationary so that only the upper bar moves up and down and carries out the sealing operation. The sealing bars may be accompanied by a simultaneous cutting as indicated by the knife 44. This knife may completely sever the bag, or may form either a line of weakened resistance or separated cuts in a dot and dash formation so that individual bags may be torn off the supply at a later point. As a cross-seal is being formed by the sealing jaws 42 and 43 moving together, the rib element 14 will be pressed directly into the groove element 13 so that at the trailing end of the previously sealed bag and the leading end of the newly formed bag, the rib and groove will be in exact alignment, while at the same time the rib and groove elements will be in unlocked position along the rest of the bag thereby permitting closing of the bag after it is filled. As referred to above, this is an essential factor because if the rib and groove are not in alignment and are not sealed together and interlocked at the edges of the bag, the rib and groove cannot be interlocked along the bag length. Or, if they are not interlocked at the end, it is possible that they can be joined in the center of the bag, but there will be an air leak at the ends where the rib and groove do not join.

In operation the film layers are intermittently advanced, and the profiles are separated by the separating finger a minimum distance, and maintained in exact alignment. They are guided back together so that they are in adjacent relationship before the sealing bar is closed. It has been found that the sealing bar must be kept very close to the trailing tip 29 of the separating finger, and that a distance of no greater than ½ should exist between the place where the sealing bars come together and the trailing end 29 of the separating finger. The sealing bars are intermittently brought together, and the bars as they first engage the film interlock the rib and groove profiles, and as they continue together, they engage the profiles and the film with sufficient pressure to form a seal. Suitable heating elements are embedded in the bars to heat them to a degree to fuse and seam the thermoplastic. The bars are then separated and a fresh width of bag is moved, and the operation is repeated to form successive bag widths.

I claim as my invention:

1. A method of preparing bags of thin plastic film having continuous reclosable fasteners comprising the steps:
   continuously advancing facing layers of plastic bag film having facing interlocked rib and groove profiles on the inner surface adjacent one edge of the layers;
   positioning a separating finger between the rib and groove profiles along the path traveled by the layers so that the profiles are separated;
   holding said rib and groove elements in exact opposing alignment while traveling over the separating finger;
   and immediately after the separating finger intermittently pressing the layers together transversely of their length at intervals determined by the width of the bags desired by pressing together sealing bars at a sealing location to press the profiles together into interlocking engagement and applying heat to form cross-seams on the layers.

2. A method of preparing bags of thin plastic film having continuous reclosable fasteners in accordance with the steps of claim 1:
   including applying the pressing step at a location no greater than ½ from the location of said separating finger.

3. A method of preparing bags of thin plastic film having continuous reclosable fasteners in accordance with the steps of claim 1:
   including supporting the layers after separation by forces against the film laterally of the profiles without engagement with the facing portions of the profiles.

4. A method of preparing bags of thin plastic film having continuous reclosable fasteners in accordance with the steps of claim 1:
   including the step of bringing the layers toward each other into touching engagement immediately prior to said step of pressing the layers together.

5. A method of preparing bags of thin plastic film having continuous reclosable fasteners in accordance with the steps of claim 1:
   including maintaining a longitudinal tension on the layers during all of the steps of the method by applying a pulling force drawing the layers over the separating finger.

6. A method of preparing bags of thin plastic film having continuous reclosable fasteners in accordance with the steps of claim 1:
   including the step of simultaneously cutting the layers at the time of said applying heat and at the location of the cross-seams.

* * * * *